United States Patent
Sheard et al.

(10) Patent No.: US 9,581,171 B2
(45) Date of Patent: Feb. 28, 2017

(54) VARIABLE PITCH FANS

(75) Inventors: Anthony Geoffrey Sheard, Colchester (GB); Andreas Rhoden, Jonkoping (SE)

(73) Assignee: Howden Axial Fans AB, Vaxjo (SE)

( * ) Notice: Subject to any disclaimer, the term of this patent is extended or adjusted under 35 U.S.C. 154(b) by 421 days.

(21) Appl. No.: 14/240,785

(22) PCT Filed: Aug. 21, 2012

(86) PCT No.: PCT/GB2012/000674
§ 371 (c)(1),
(2), (4) Date: Jun. 2, 2014

(87) PCT Pub. No.: WO2013/027002
PCT Pub. Date: Feb. 28, 2013

(65) Prior Publication Data
US 2014/0314574 A1  Oct. 23, 2014

(30) Foreign Application Priority Data
Aug. 25, 2011 (GB) .................................. 1114702.2

(51) Int. Cl.
*F04D 29/36* (2006.01)
*F16C 33/372* (2006.01)
(Continued)

(52) U.S. Cl.
CPC ............. *F04D 29/36* (2013.01); *F01D 25/16* (2013.01); *F01D 25/162* (2013.01); *F01D 25/18* (2013.01);
(Continued)

(58) Field of Classification Search
CPC ........ F04D 29/34; F04D 29/36; F04D 29/329; F04D 29/323; F04D 29/06; F04D 29/063;
(Continued)

(56) References Cited

U.S. PATENT DOCUMENTS 2,897,021 A   7/1959   Zeilman
4,269,460 A   5/1981   Orain
(Continued)

FOREIGN PATENT DOCUMENTS

DE    499378 C    6/1930
EP    0291162 A1    11/1988
(Continued)

OTHER PUBLICATIONS

International Search Report Mailed Sep. 19, 2013 for PCT/GB2012/000674 Filed Aug. 21, 2012.

*Primary Examiner* — Atif Chaudry

(57) ABSTRACT

An axial air movement fan having a plurality of variable pitch fan blades (2), extending radially from a hub (4) rotatable about a main axis (3), each blade (2) further being pivotable about its radial axis to vary the blade pitch. The blades (2) each are mounted on an associated bearing (5) mounted on said hub, the bearing comprising a ball bearing having a first radially inner race (25) fast the blade (2) and a second radially outer race (26) rotationally fast to the hub (4). The balls (14) in the bearing are separated by separators (15), each separator being generally cylindrical and having its cylindrical axis coaxial with the orbital axis (22) of the orbit of the balls (14) and being adapted to rotate about the said orbital axis (22), the side faces of the separator each having a part spherical recess (16) adapted to receive a ball (14). Rotation of the separator (15) about the orbital axis (22) is such as to entrain lubricant in the bearing and to bias the lubricant from adjacent the outer race (26) over the balls (14) towards the inner race (25).

8 Claims, 5 Drawing Sheets

Figure 2:
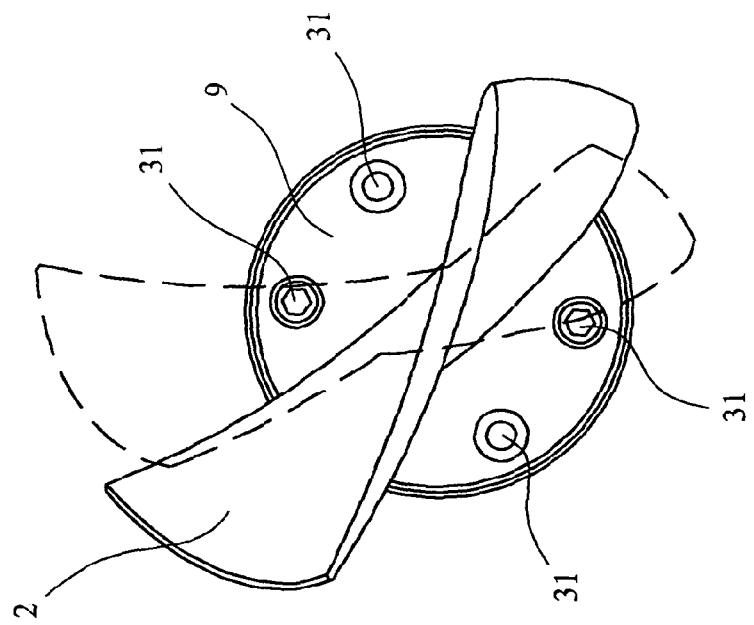

(51) Int. Cl.
*F16C 33/37* (2006.01)
*F16C 33/374* (2006.01)
*F01D 25/18* (2006.01)
*F04D 29/32* (2006.01)
*F04D 29/34* (2006.01)
*F01D 25/16* (2006.01)
*F04D 29/063* (2006.01)
*F04D 29/06* (2006.01)
*F16C 19/20* (2006.01)
*F04D 29/05* (2006.01)
*F16C 33/66* (2006.01)
*F16C 19/10* (2006.01)
*F04D 29/056* (2006.01)

(52) U.S. Cl.
CPC ........... *F04D 29/05* (2013.01); *F04D 29/056* (2013.01); *F04D 29/06* (2013.01); *F04D 29/063* (2013.01); *F04D 29/323* (2013.01); *F04D 29/329* (2013.01); *F04D 29/34* (2013.01); *F16C 19/10* (2013.01); *F16C 19/20* (2013.01); *F16C 33/37* (2013.01); *F16C 33/372* (2013.01); *F16C 33/374* (2013.01); *F16C 33/3706* (2013.01); *F16C 33/3713* (2013.01); *F16C 33/6614* (2013.01); *F16C 33/6629* (2013.01)

(58) Field of Classification Search
CPC ........ F01D 25/16; F01D 25/162; F01D 25/18; F16C 19/20; F16C 33/3713; F16C 33/3706; F16C 33/374; F16C 33/37; F16C 33/372
See application file for complete search history.

(56) References Cited

U.S. PATENT DOCUMENTS 5,779,446 A * 7/1998 Althof ........................ F01D 7/00
416/162
2004/0151406 A1* 8/2004 Yamaguchi ......... F16C 33/3706
384/43

FOREIGN PATENT DOCUMENTS

EP 1835190 A2 9/2007
EP 2213892 A2 8/2010

* cited by examiner

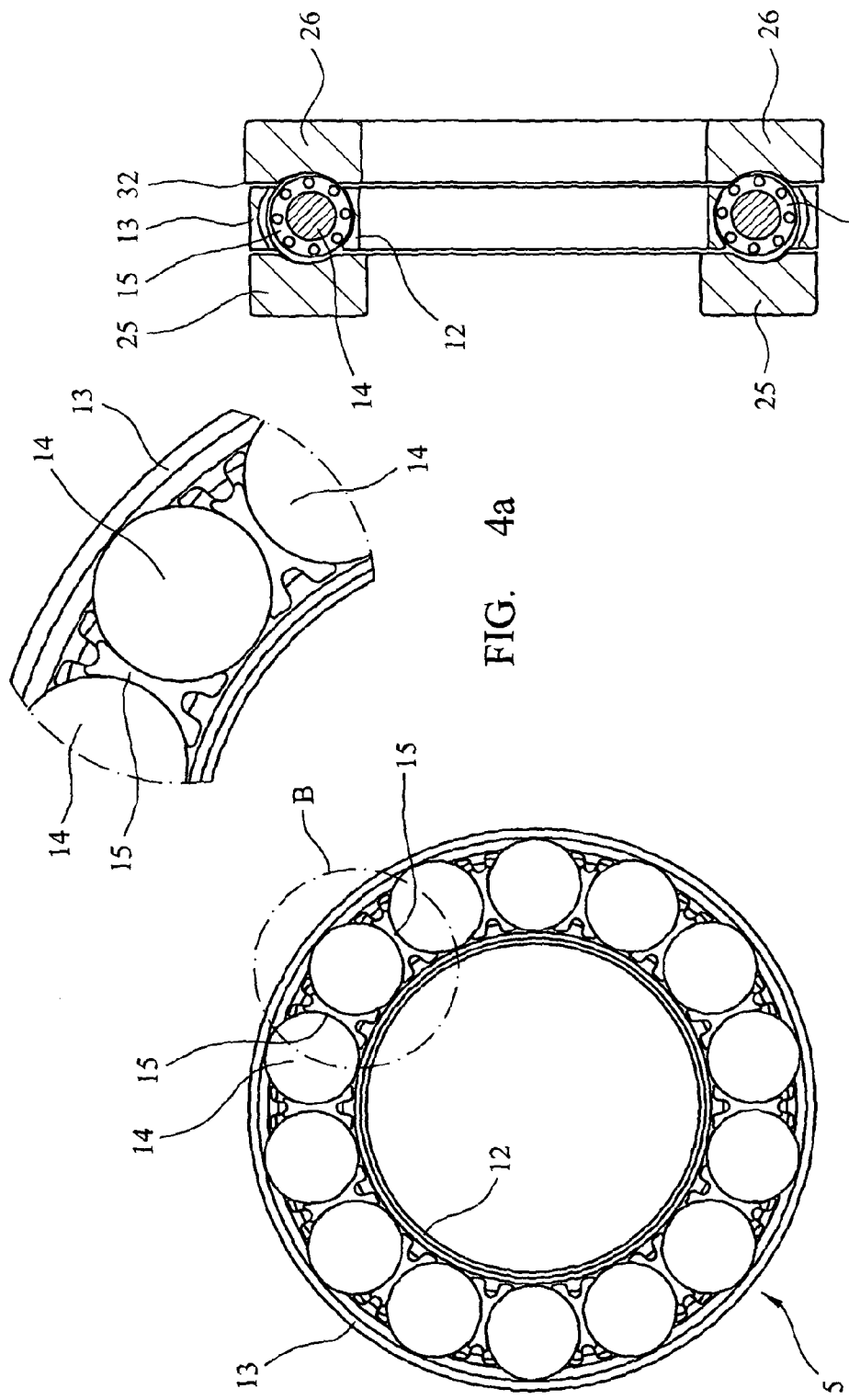

VARIABLE PITCH FANS

The present invention relates to an axial air movement fan having a plurality of variable pitch fan blades rotatable about a main axis, each fan blade extending radially from a hub rotatable about the main axis and being pivotable about its radial axis to provide variable pitch for the blades.

Such fans are known and, typically, the fan blades are each mounted in a bearing on the hub so as to be pivotable from a radial plane of the fan to vary the pitch of the fan blades. Typically, the blades are pivotable through an angular range of movement between 10-80° to provide a fine pitch) (10° and a coarse pitch) (80°. Such arrangements have the disadvantage that, as the bearing does not fully rotate, but pivots backwards and forwards there is a tendency, caused by centrifugal force, for lubricant in the bearing, typically grease, to move to the outer race. The limited degree of movement of the bearing, which is usually a ball bearing, means that the lubricant is not transferred from the outer race to the inner race by the balls in the conventional manner since the balls do not rotate enough to entrain sufficient lubricant and move it to the inner race, which thus tends to run dry. This leads to premature wear and failure in the bearing and the present invention seeks to provide a solution to this problem.

According to the present invention there is provided an axial air movement fan having a plurality of variable pitch fan blades, each fan blade extending radially from a hub rotatable about a main axis, each blade further being pivotable about its radial axis to vary the blade pitch, the blades each being mounted on an associated bearing mounted on said hub, the bearing comprising a ball bearing having a first inner race rotationally fast on one of the hub or the fan blade and a second outer race rotationally fast to the other of the hub or fan blade, the balls in the bearing being separated by separators, each separator being generally cylindrical and having its cylindrical axis coaxial with the orbital axis of the orbit of the balls and being adapted to rotate about the said orbital axis, the side faces of the separator each having, a part spherical recess adapted to receive a ball, rotation of the separator about the orbital axis being such as to entrain lubricant in the bearing and to bias the lubricant from adjacent the outer race towards the inner race.

Preferably, the part spherical recesses have a radius greater than that of the balls. In a preferred embodiment, the separators each have a circumferential recess in its exterior circumference forming an annular reservoir for lubricant, at least one passage extending from the reservoir into each of the part spherical recesses to enable lubricant to flow to and from the reservoir on to the surfaces of the recesses.

Preferably, a plurality of the said passages are disposed about the annular reservoir to provide a plurality of pathways to the part spherical recesses.

In a further preferred embodiment, the openings of the passages into the part spherical recesses have, extending from the openings, grooves in the surface of the recesses to assist in the distribution of lubricant across the surfaces of the recesses and the balls.

Preferably, the grooves gradually reduce in depth and width away from the openings and may also extend substantially radially inwardly from the openings.

Figure 1:
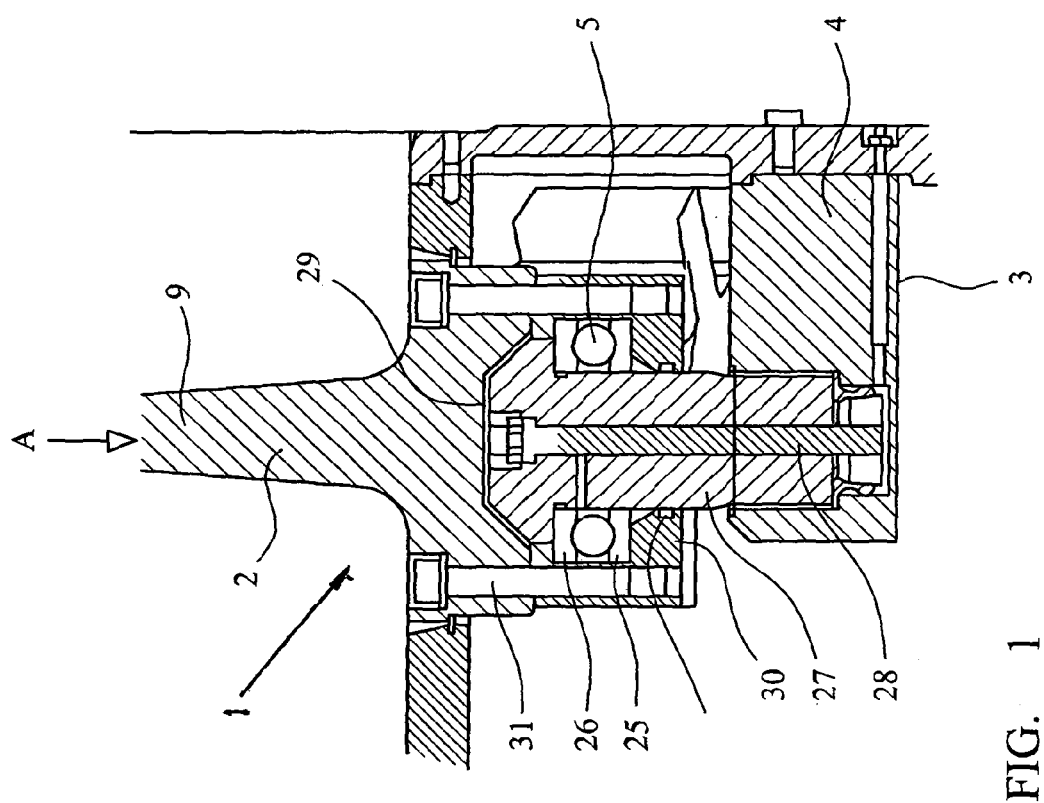
Figure 3:
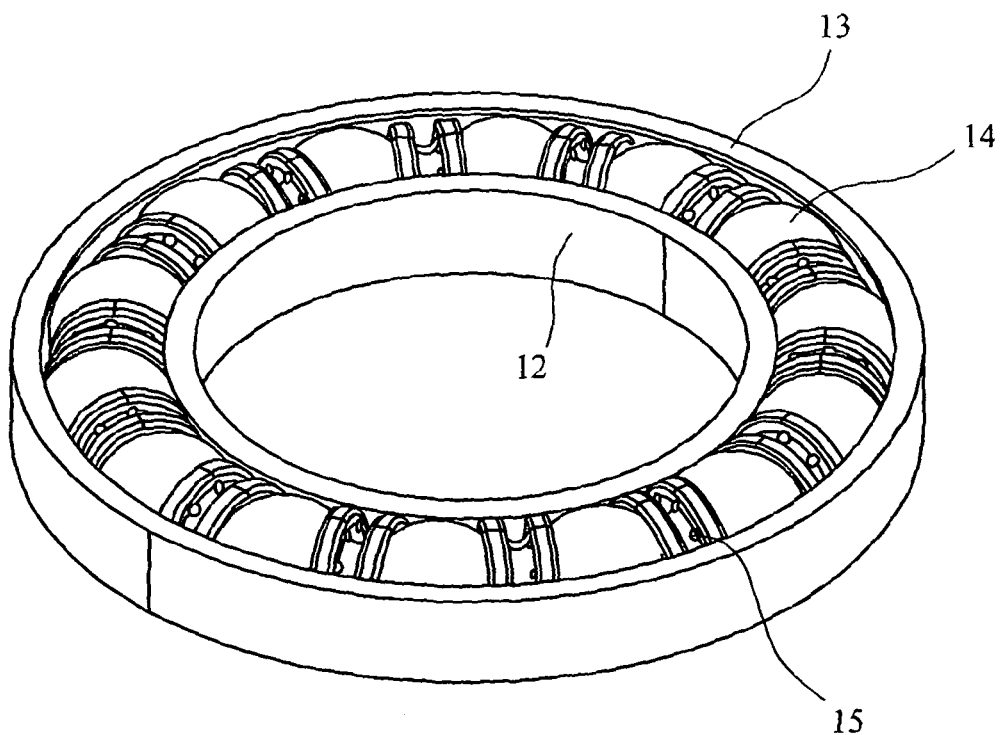
Figure 10:
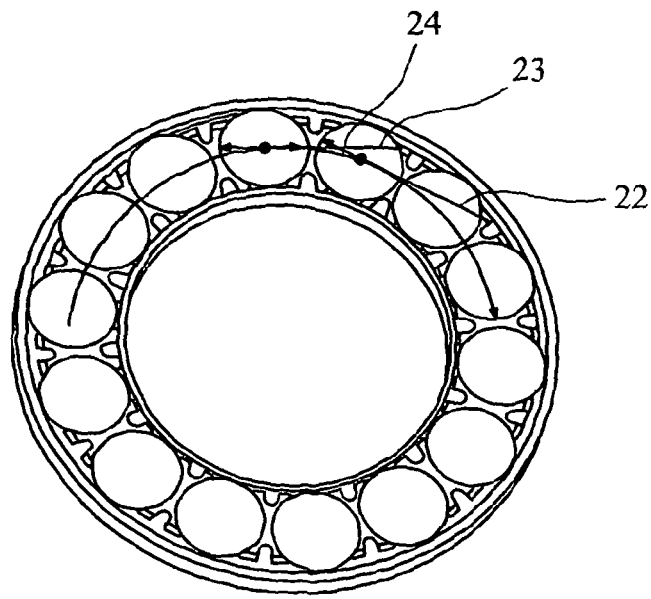
Figure 7:
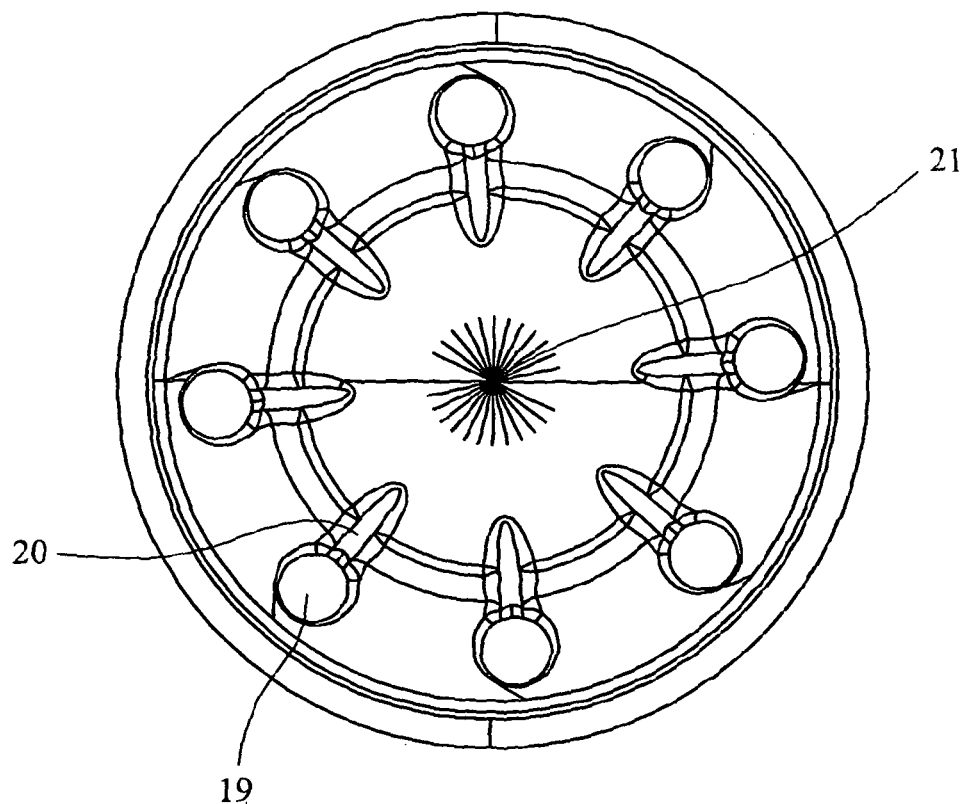
Figure 6:
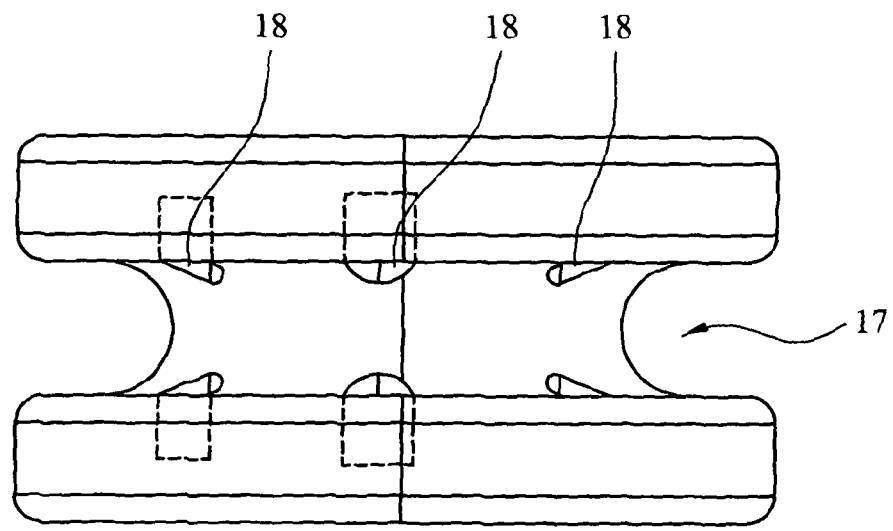
Figure 8:
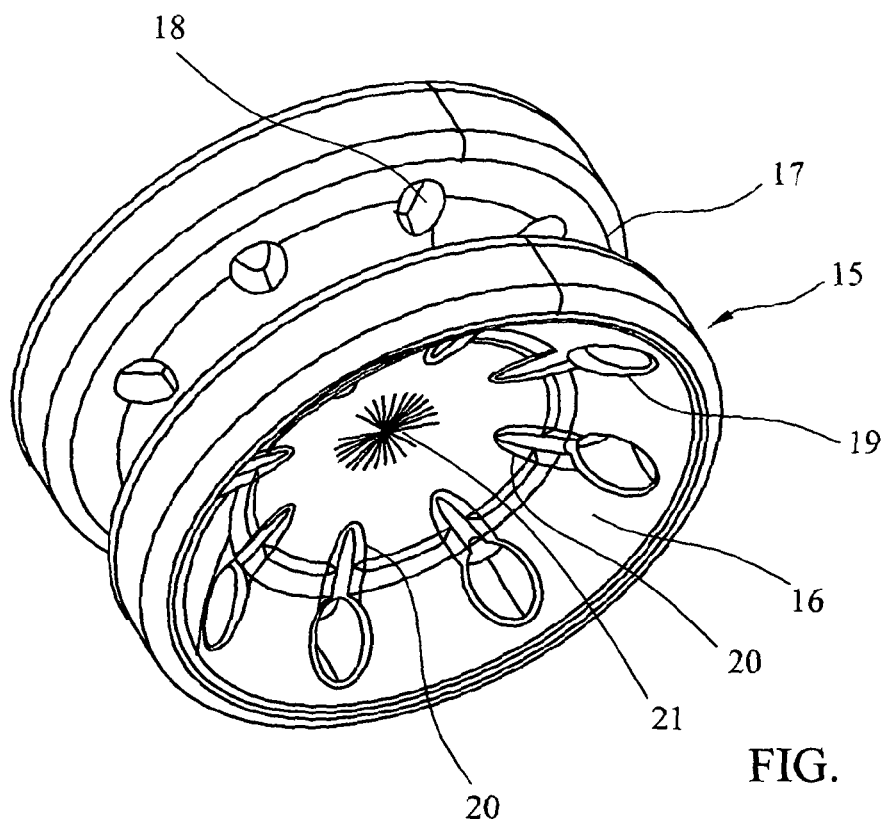
Figure 9:
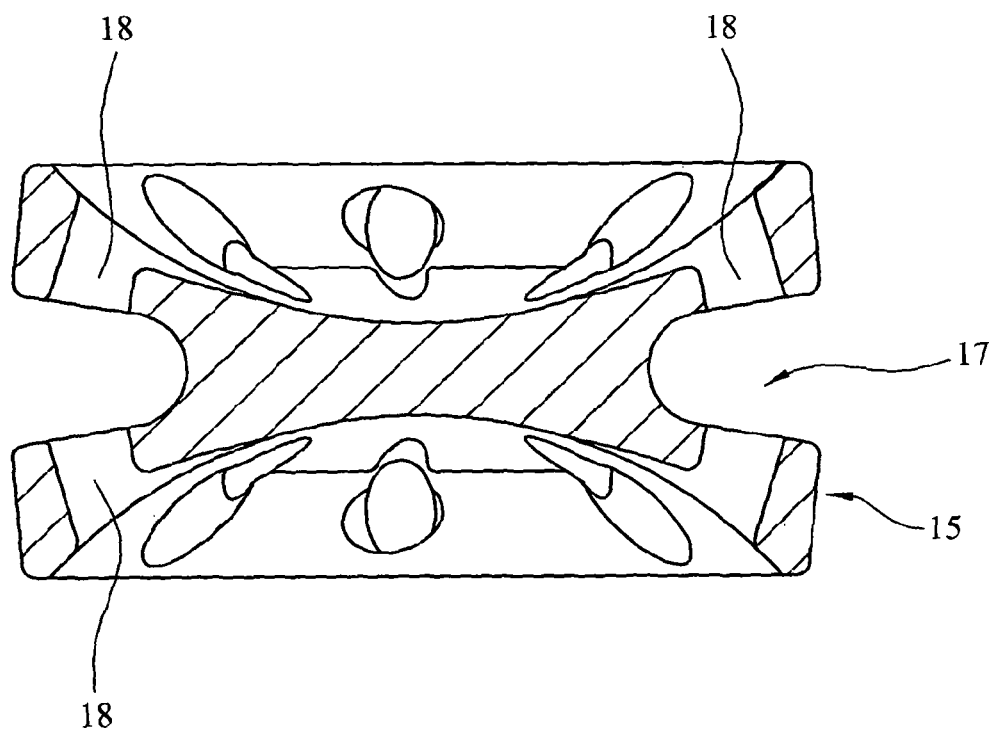

A preferred embodiment of the present invention will now be described by way of example with reference to the accompanying drawings, in which:

FIG. 1 shows a schematic sketch through a hub and single fan blade of a variable pitch fan pivotally mounted on a bearing on the hub, FIG. 2, shows a radially inward looking sketch of the fan blade of FIG. 1 in the direction of the arrow A, FIG. 3 shows a perspective view of the bearing shown in FIG. 1, FIG. 4 shows a plan view of the bearing of FIG. 3, FIG. 4a shows a scrap view of the part circled as reference B in FIG. 4, FIG. 5 shows a sectional side view of the bearing of FIG. 4, FIG. 6 shows a radial view of the separator, FIG. 7 shows an axial view of an end face of the separator, FIG. 8 shows a perspective view of a separator separating the balls in the bearing, FIG. 9 shows a modified embodiment of the separator, and FIG. 10 illustrates the manner in which the movement of the balls so as to rotate the separators.

Referring to FIG. 1 there is shown, in schematic form, part of an axial air movement fan 1 having a plurality of radially extending blades 2, only one of which is shown. The fan has a main axis 3 and a hub 4 rotatable about the main axis 3 and the fan blades are disposed about the hub substantially in the same radial plane. The mounting of each of the blades on the hub 4 is identical so only one blade need be described. The fan blade is mounted on a ball bearing 5 so that, as illustrated particularly in FIG. 2, the fan blade 2 is able to pivot about a radial axis 9 from a fine pitch position shown in solid lines where it is offset by about 10° from a radial plane 10, to a coarse pitch position shown in dotted lines where it is offset by up to 80° from the radial plane. The mechanism for carrying out the pivotal movement of the fan blades is not shown.

The ball bearing 5 has a radially inner race 25 and a radially outer race 26. The outer race 26 is secured against rotation to a shoulder on a mushroom shaped mounting 27 which is secured to the hub 4 by a bolt 28. At its root, the fan blade 2 has a recess 29 which is a snug fit on the mushroom head of the mounting 27. The fan blade 2 is secured to the inner race 25 via a counterweight ring 30 by means of four bolts 31 which, when tightened, clamp the fan blade 2 firmly to the bearing 5 and hence through the mushroom shaped mounting 27 to the hub 4. The counterweight ring 30 is able to rotate with the inner race 25 relative to the mounting 27 and a seal 31 is provided between the ring 30 and the mounting 27 to minimise the escape of grease from the bearing. In operation, as the fan rotates the centrifugal force of the blade 2 tends to increase the load on the bearing through the inner race 25, the slight deformation caused by this tending to lift the blade from its clamped position on the mounting 27 to facilitate its pivotal movement.

Referring now to FIG. 3, there is shown a perspective view of the bearing 5, which consists of an inner retaining ring 12 and an outer retaining ring 13 formed of a plastics material between which a plurality of steel balls 14 are located. Adjacent balls are spaced apart by separators 15 which will be described in greater detail in connection with FIGS. 6-9. The retaining rings 12, 13 serves to hold the balls 14 and separators 15 together as a sub-assembly prior to assembly of the bearing and also have the additional advantage of assisting in retaining grease in the bearing during service operations. As illustrated in FIG. 5, it can be seen in the assembled bearing that only a very small gap 32, necessary for practical purposes, is provided between the retaining rings 12 and 13.

As shown in FIGS. 6-9, each separator 15 consists of a generally cylindrical body having on its two side faces part spherical recesses 16 which are adapted to receive and locate the balls 14 of the ball bearing, the separators being dimensioned such that there is little or no free play between the balls 14 and the separators 15. The radius of the recesses 16 is slightly larger than the radius of the balls. In its circumferential periphery, the separator has a recess 17 which forms an annular reservoir for lubricant, in the form of grease, for lubricating the bearing 5. The annular reservoir is sufficiently deep for walls to be formed between the reservoir and the part spherical recesses and, as shown particularly in FIGS. 6 to 8, a plurality of passages 18 are provided leading from the reservoir 17 through the walls and into the part spherical recesses, thus enabling lubricant to pass from the reservoir 17 to lubricate the recesses 16 and the balls 14. Because the radius of the part spherical recesses 16 is larger than that of the balls, a space is formed between the balls 14 and the openings 19 of the passages 18 on the faces of the part spherical recesses. This facilitates the passage of lubricant from the reservoir 17 into the recesses. By having a larger radius for the recesses, the contact surface between the balls 14 and separators 15 is reduced which has the additional advantage that friction between the separators and the balls 14 is reduced. As shown in the first embodiment, the passages extended through the walls in a direction parallel to the axis of rotation of the separator. In an alternative embodiment illustrated in FIG. 9, the passages 18 are inclined towards the axis of rotation of the separators in the direction from the reservoir towards the part-spherical faces, and this facilitates the passage of grease from the reservoir 17 into the recesses. In a further embodiment, not illustrated guides may be provided in the reservoir to assist in guiding the grease towards and into the passages Distribution of the lubricant across the surface of the part spherical recesses 16 is improved by the provision of grooves extending from the openings 19 generally radially inwardly, the depth and width of the grooves gradually reducing until they merge into the surface of the recesses.

As the separators 15 have a constant cross section in their axial plane, that is are symmetrical, the separators are able to rotate about their axial axis 21 which is co-axial with the orbital axis 22 of the balls as shown in FIG. 10. In operation, when the fan blade and hence the bearing is being pivoted the balls rotate and move along the circular orbit 22 determined by the diameter of the retaining rings 12, 13. As a result of centrifugal forces, each ball 14 is biased to move in the tangential direction to the circular orbit as shown by the line 23. Each separator 15 is acted upon by two balls, one leading and one trailing. The forces imposed on the separator by the two balls are different since the balls are in different positions on the circular orbit as shown by the line 24 in comparison with the tangential force is shown by the line 23. The resultant forces act on the separator 15 at two slightly different angles which causes the separator to rotate about its axis 21, which is coaxial with the orbital axis 22 of the balls. When the pivotal movement of the blade is reversed, the direction of rotation of the separators 15 is also reversed.

Centrifugal force tends to bias the lubricant towards the outer retaining, ring 13, from where it is urged through the passages 19 successively as the separator rotates. In this way the lubricant is spread more efficiently over the entire surface of the balls to improve the lubrication between the ball and the inner race.

The use of individual separators 15 between the balls has the additional advantage that they are able to move independently. In traditional bearings in which the balls are located in an annular one piece bearing cage, stresses are inevitably caused by the fact of holding each ball rigidly relative to the other balls. The separators of the present invention permit slight movement of the bearing balls relative to one another which eliminates this source of stress with the resultant improvement in the service life of the bearing.

The invention claimed is:

1. An axial air movement fan having:
   a plurality of variable pitch fan blades, each fan blade extending radially from a hub rotatable about a main axis, each blade further being pivotable about its radial axis to vary the blade pitch, the blades each being mounted on an associated bearing mounted on said hub,
   the bearing comprising a ball bearing having a first inner race rotationally fast on one of the hub or the fan blade and a second outer race rotationally fast to the other of the hub or fan blade,
   the balls in the bearing being separated by separators, each separator being generally cylindrical and having its cylindrical axis coaxial with the orbital axis of the orbit of the balls and being adapted to rotate about the said orbital axis,
   the side faces of the separator each having a part spherical recess adapted to receive a ball,
   wherein rotation of the separator about the orbital axis is such as to entrain lubricant in the bearing and to bias the lubricant from adjacent the outer race over the balls towards the inner race, and
   wherein the separators each have a circumferential recess in its exterior circumference forming an annular reservoir for lubricant, at least one passage extending from the reservoir into the part spherical recesses to enable lubricant to flow to and from the reservoir on to the surface of the recesses.

2. An axial fan as claimed in claim 1 wherein the part spherical recesses have a radius greater than that of the balls.

3. An axial fan as claimed in claim 1, wherein a plurality of the said passages are disposed about the annular reservoir to provide a plurality of pathways to the part spherical recesses.

4. An axial fan as claimed in claim 3 wherein the passages extend substantially parallel to the axis of rotation of the separator.

5. An axial fan as claimed in claim 3 wherein the passages extend at an angle inclined towards the axis of rotation of the separator.

6. An axial fan as claimed in claim 1, wherein openings of the passages into the part spherical recesses have, extending from the openings, grooves in the surface of the recesses to assist in the distribution of lubricant across the surface of the recesses and the balls.

7. An axial fan as claimed in claim 6 wherein the grooves gradually reduce in depth and width away from the openings.

8. An axial fan as claimed in claim 7 wherein the grooves extend substantially radially inwardly from the openings.

\* \* \* \* \*